United States Patent [19]

Schmid

[11] Patent Number: 4,851,699

[45] Date of Patent: Jul. 25, 1989

[54] DEVICE FOR MECHANICALLY ACCEPTING EMPTIES

[75] Inventor: Dieter Schmid, Aystetten, Fed. Rep. of Germany

[73] Assignee: Lescha Maschinenfabrik GmbH & Co. KG, Augsburg, Fed. Rep. of Germany

[21] Appl. No.: 189,200

[22] Filed: Apr. 29, 1988

[30] Foreign Application Priority Data

May 12, 1987 [DE] Fed. Rep. of Germany ....... 3715815

[51] Int. Cl.$^{4}$ ............................................... G01N 9/04

[52] U.S. Cl. ................................ 250/223 B; 356/240; 250/560

[58] Field of Search ............... 250/223 R, 223 B, 560, 250/561; 209/525; 356/240

[56] References Cited

U.S. PATENT DOCUMENTS 4,253,573 3/1981 Dubberly et al. ............... 250/223 B 4,691,231 9/1987 Fitzmorris et al. ................. 356/240

*Primary Examiner*—David C. Nelms

*Attorney, Agent, or Firm*—Jones, Tullar & Cooper

[57] ABSTRACT

In the case of a device for mechanically accepting empties, more particularly bottles subject to a deposit, with a conveying device and a sensing device associated therewith, a high degree of reliability and a simple design are made possible inasfar as such conveying means comprises a conveying passage which comprises two parallel sections which are offset in relation to each other in the direction of conveying and have conveying belts placed side by side and arranged to be driven at different speeds, and an intermediate member extending obliquely in relation to the direction of motion of the conveying belts so as to bridge over a gap between the adjacent conveying belts, an outlet end part of the section with the more rapid conveying belt under it extending past the sensing means, which has a number of vertically offset sensing elements, aligned so as to be generally parallel to the plane of conveyance and adapted to sense the diameter of the empties.

17 Claims, 4 Drawing Sheets

FIG 4
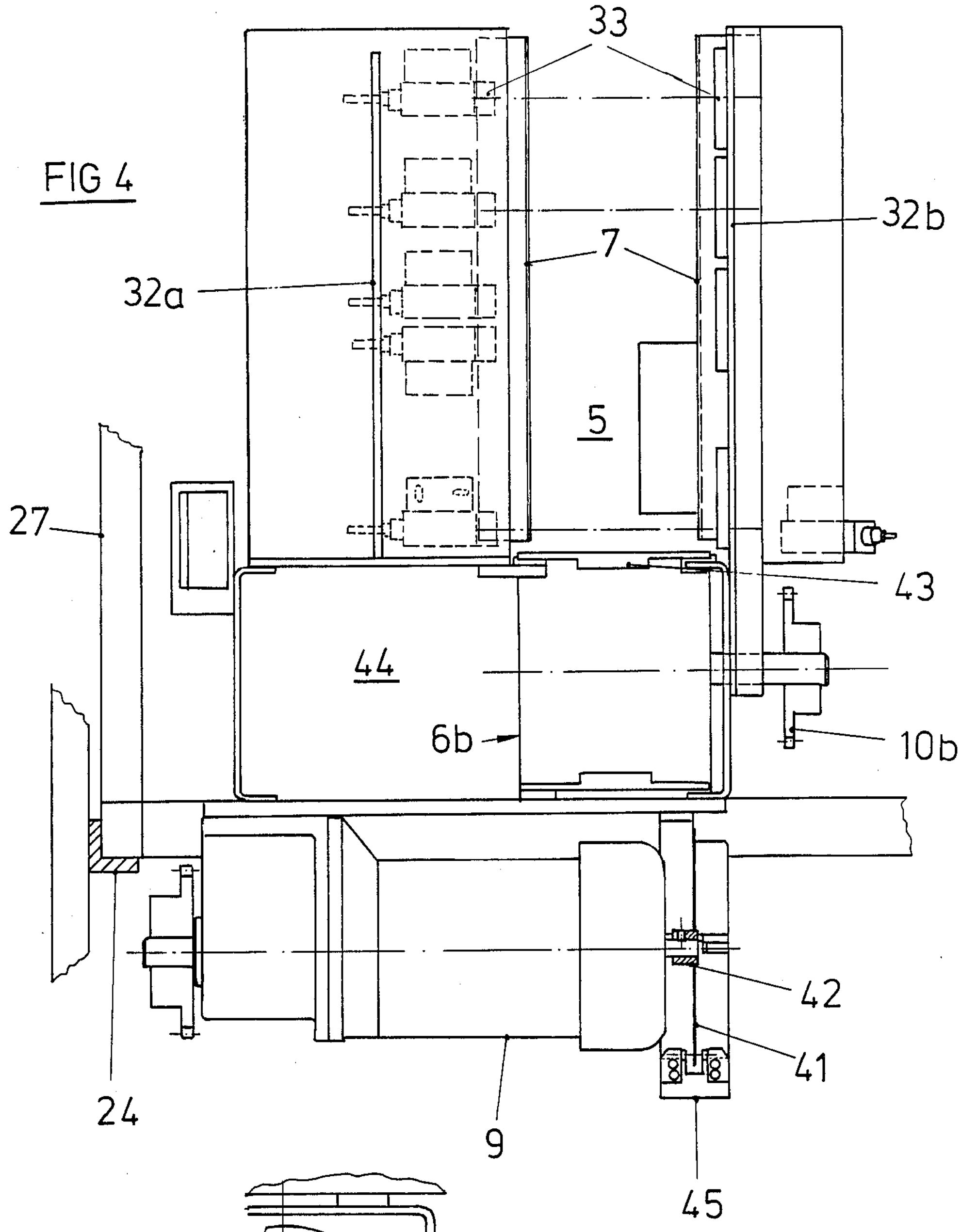
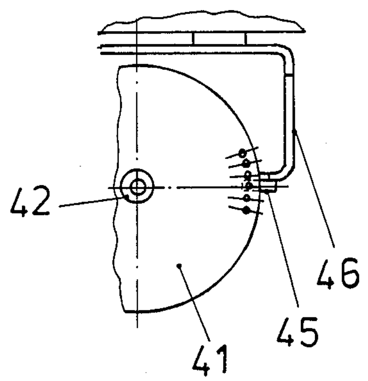
FIG 5

DEVICE FOR MECHANICALLY ACCEPTING EMPTIES

BACKGROUND OF THE INVENTION

The present invention relates to a device for mechanically accepting empties, more particularly bottles subject to a deposit, with a conveying device and a sensing device associated therewith.

In the presently widespread arrangements of this type the empty bottles are turned past the sensing device, by means which may be in the form of a turntable or the like. A disadvantage in this respect is that there may be different speeds in way dependent on the respective length of the acting pivoting arm. If the bottles are turned about their own axes it is necessary for the advancing motion to be interrupted. The above-mentioned disadvantages will be seen to have an undesired effect on the accuracy, reliability and throughput which are possible.

SHORT SUMMARY OF THE PRESENT INVENTION

Taking this prior art as a starting point one object of the present invention is to provide a device of the initially mentioned type which is improved by the use of simple and low-price means in such a way that despite a simple and sturdy structure it is possible to assure a high degree of accuracy and reliability together with a high throughput rate.

In order to achieve these or other objects appearing in the present specification and claims the conveying device has a conveying passage which has two parallel sections which are offset in the direction of conveying and are placed over adjacent conveying belts driven at different speeds and an intermediate member extending obliquely in relation to the direction of the conveying belts so as to cross over the joint gap between the adjacent conveying belts, and whose section on the outlet side placed over the more rapidly driven conveying belt moves past the sensing device, which has a number of sensing elements which are offset in level and are generally in parallel alignment with the conveying plane, such sensing elements being adapted to sense the diameter of the empties.

These features make it possible to completely remedy the above-mentioned shortcomings. One advantage of the features provided by the invention is that they enable continuous operation to take place without interruption. Simply moving the bottles past the sensing device is all that is required to measure the diameters of the bottles. On the other hand diameter classification in a number of classes is possible for example on the basis of five different levels in order to make possible a completely satisfactory identification of the bottles. The invention furthermore leads to the advantage of an automatic alignment and separation of the consecutive bottles prior to their being sensed. The bottles entering the obliquely extending intermediate member of the conveying passage in the direction of motion of the belts in fact automatically take up positions against the side wall of the conveying passage whatever their position on the rear conveying belt adjacent to the intermediate member and accordingly move past the sensing device, which is arranged at the side adjacent to the discharge section, with a precisely set clearance. The separation of the consecutive bottles thus simply takes place owing to different belt speeds. The explanations given so far will serve to show that the invention ensures a high functional reliability with simple and accordingly low-cost means.

It is an advantage if the sensing elements are in the form of reflection photoelectric detectors. It is a question of contactless sensing elements which provide a signal corresponding to the time taken for the articles to be moved past them so as to intersect their axis. This signal may be combined with a the speed of the respective conveying belt so that the diameter may then be derived from this. These features lead to the further advantage that it is then possible to provide a binarily encoded piece of information, this facilitating digitizing and machine processing of the data obtained.

In accordance with a further convenient form of the invention the speed of the more rapidly moving conveying belt moving past the sensing device is detected by means of a measuring device coupled with it. In this case it is possible to ensure that the light and dark signals of the sensing device are mixed with the respectively present speed data of the conveying belt so that inaccuracies due to variations in speed are avoided. For this purpose it is simply possible to use an incremental disk connected with the bend roll of the respective conveying belt so that the rotational steps of the disk are able to be detected by means of an associated sensor, this leading to an extremely simple but nevertheless reliable arrangement with automatic digitalization.

As a further development of the invention it is possible for the conveying passage to be arranged so that its front end extends into the gap between two ejector disks rotating about axes perpendicular to the plane of conveying. These ejector disks have the advantageous effect of leading to positive ejection and thus to positive removal from the measurement zone, something that means that there is a useful effect on the obtainable accuracy and functional reliability. It is convenient if the conveying passage is so placed as to deliver to a table served by the ejector disks so that there is a large pile-up space.

A further possible feature of the invention is one in which adjacent to the inlet and outlet of the conveying passage there are photoelectric detectors, which are preferably arranged so as to be oblique in relation to the conveying plane and conveying direction. This feature opens up the possibility of automation by automatic start and stop. The spatially oblique arrangement of the photoelectric detectors leads in this context to the advantage of being able to sense or scan the full cross section of the conveying passage with the aid of the photoelectric means.

Further advantageous developments and convenient further features of the invention will be gathered form the following account of one working embodiment of the invention to be read in conjunction with the drawings.

LIST OF THE SEVERAL VIEWS OF THE DRAWINGS.

FIG. 4 is a section taken on the line IV/IV of FIG. 3.

FIG. 5 shows one example of the system for measuring distances using an incremental disk.

DETAILED ACCOUNT OF WORKING EXAMPLE OF THE INVENTION.

Figure 1:
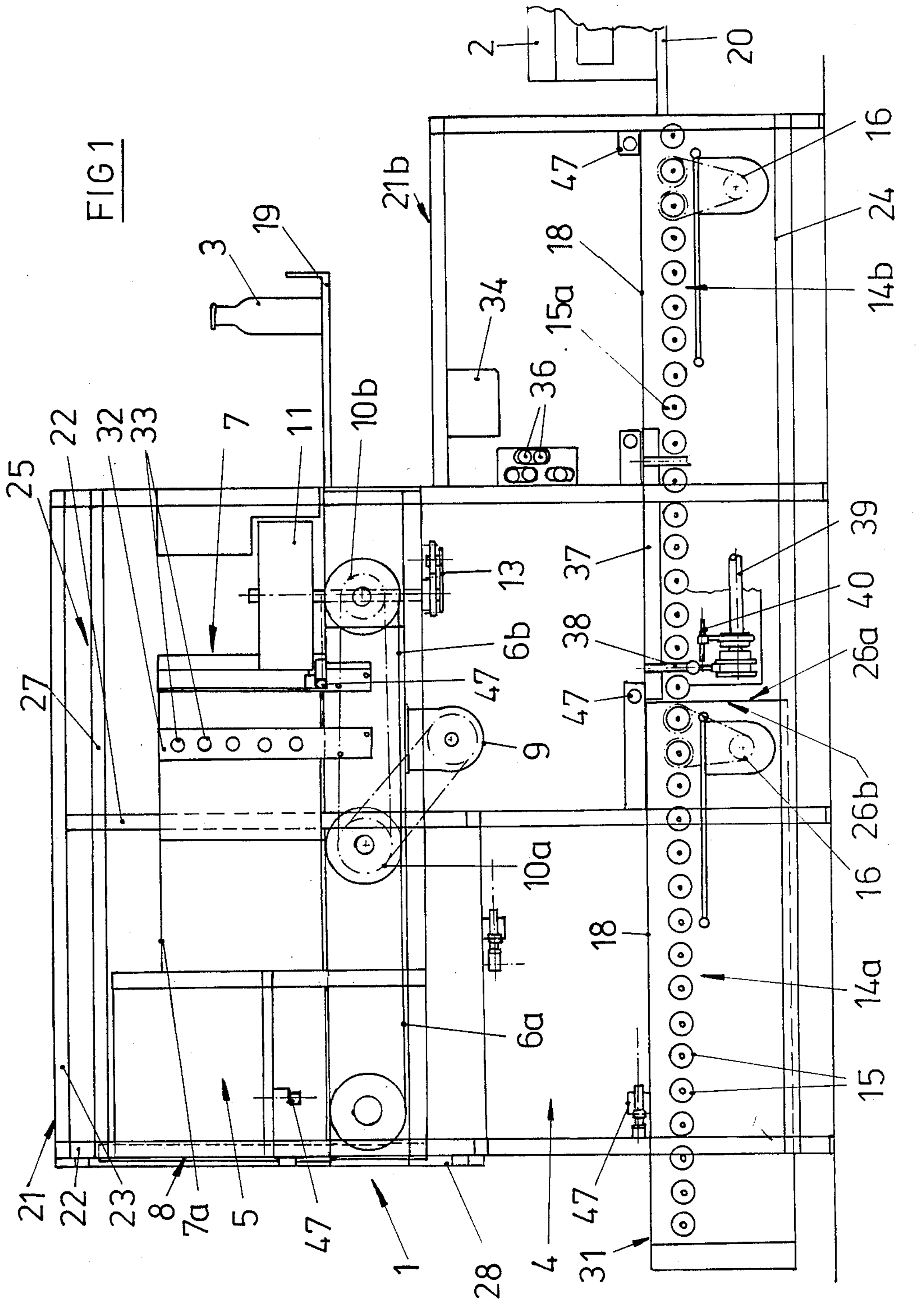
FIG. 1 is a side view of an empties receiving station for bottles and crates thereof with the cladding removed.
Figure 2:
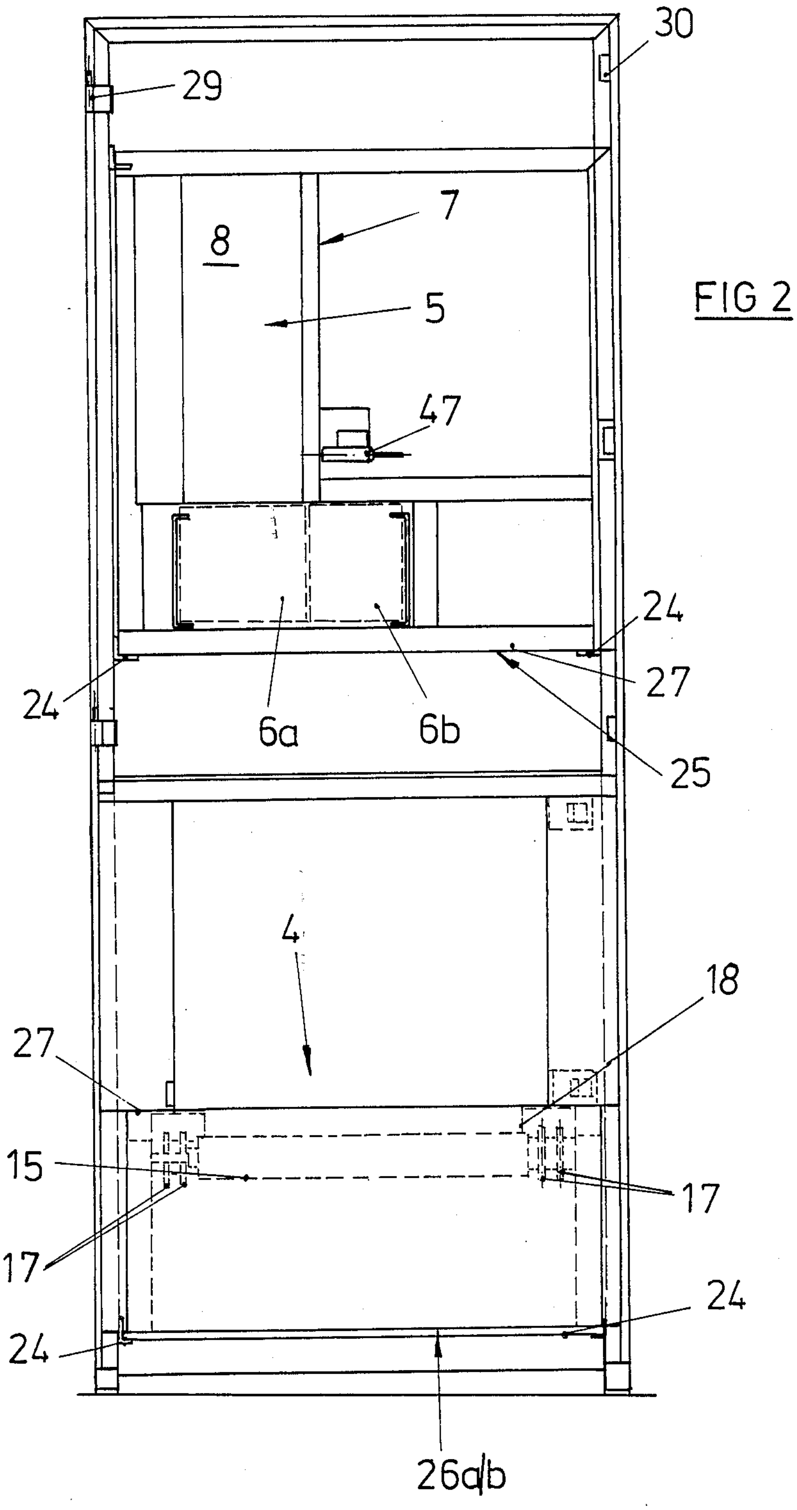
FIG. 2 is an end-on view of the arrangement as in FIG. 1 with the front door removed.

Since beverage empties may be in form of single bottles and of bottle crates, the beverage empties receiving station generally referenced 1 possesses, as will be seen from FIGS. 1 and 2, a lower draw-in path for bottle crates 2 and a draw-in path arranged thereover for single bottles 3. Accordingly there are two superposed conveying passages 4 and 5, respectively, which are accessible from the front and which are equipped with their own scanning devices and with crate and bottle conveying means moved past such scanning devices. In this respect the conveying passage 4 of the crate draw-in path has a straight course between its inlet and its outlet. The conveying passage 5 associated with the bottle draw-in path possesses, as will best be seen from FIG. 3, two parallel sections **5*a* and 5*b*, respectively, offset in relation to each other in the direction of conveyance, and which are connected with each other by an intermediate member 5c** extending perpendicularly thereto.

In order to constitute the bottle conveying means forming the floor of the conveying passage, the present working example of the invention has two conveying belts 6 and **6*b* which are arranged one after the other with mutual overlap and are offset by their breadth laterally in relation to each other by an amount corresponding tot the lateral offset of the sections 5*a* and 5*b* of the conveying passage. To form a lateral wall of the respective conveying passage 5 the conveying belts 6*a* and 6*b* have overlapping sheet metal parts 7. The latter possess, as will best be seen from FIG. 3, a part 7*a* extending obliquely to the direction of the belt for the intermediate member in the overlap zone of the conveying belts 6*a* and 6*b*. This part 7*a* practically forms an apron spanning the gap between the conveying belts 6*a* and 6*b* for passing the bottles to be conveyed from the rear section 5*a* to the following section 5*b* of the conveying passage. After introduction of the bottles 3 via an inlet gap best to be seen in FIG. 2, the bottles are drawn off by the rear conveying belt 6*a* in the direction of belt motion. Whatever its position on the conveying belt 6*a* each bottle is then moved on the apron 7*a* extending over the belt and is moved along the latter until it is entrained by the second conveying belt 6*b*. The bottles 3 are then located practically in lateral engagement with the lateral sheet metal part 7, turned towards the first conveying belt 6*a*, of the second conveying passage section 5*b***.

Figure 3:
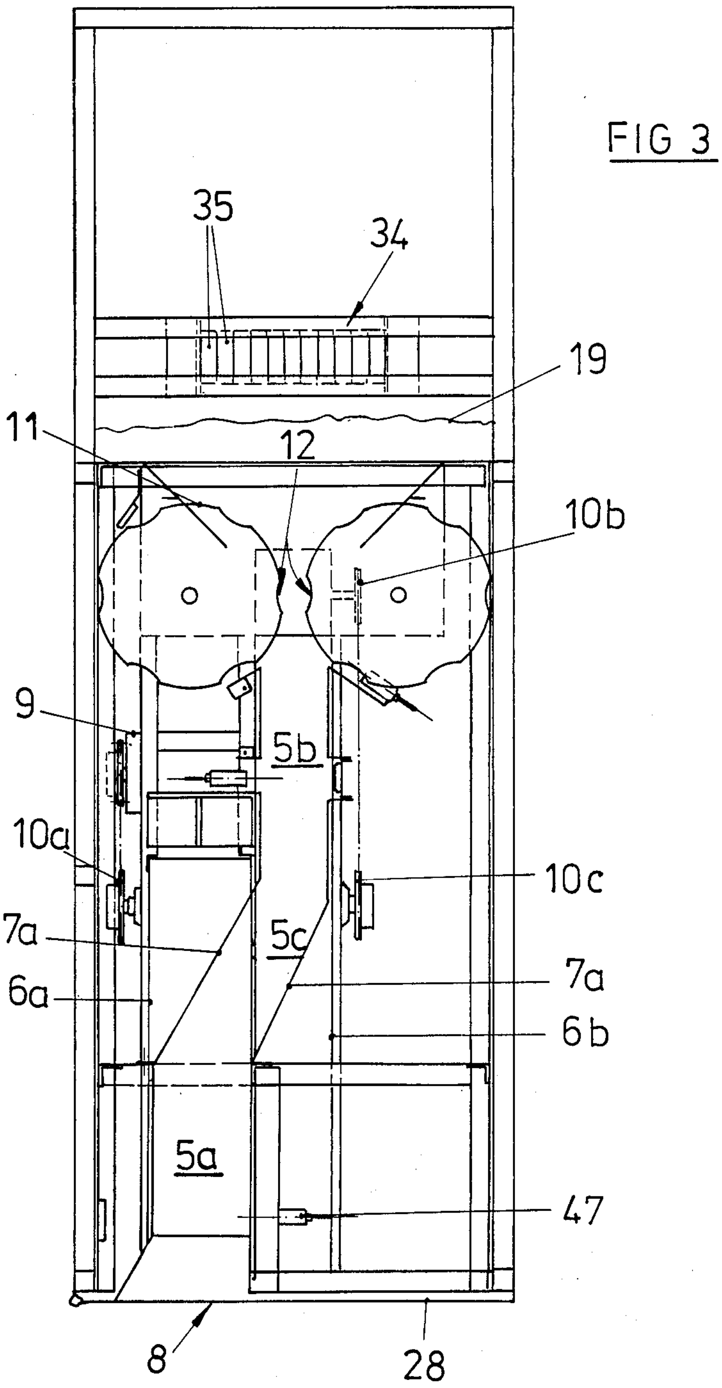
FIG. 3 is a plan view of the arrangement shown in FIG. 1.

In order to separate the consecutively arranged, moving bottles, that is to say to produce a spacing between one bottle and the next, the second conveying belt **6*b* is driven at a somewhat higher speed than the first conveying belt 6*a*, this being indicated in FIGS. 1 and 3 by way of the different diameters of the drive wheels 10*a* and 10*b*, respectively, for the two conveying belts 6*a* and, respectively, 6*b*, which are driven by a common drive motor 9. Since on passing from the first conveying belt 6*a* to the second conveying belt 6*b* the bottles are laterally aligned, the conveying passage may become narrower to a corresponding extent, as will best be seen from FIGS. 3. The section 5*a*, which is to the front in the direction of conveyance, may correspondingly be made narrower than the rear conveying passage section 5*a*. The same applies for the conveying belts 6*a* and 6*b***.

At its end the section **5*b*, which is to be fore in the direction of conveying, the conveying passage runs into the gap between two draw-off disks 11, rotating about axes which are perpendicular to the plane of transport. These disks may be clad in rubber or rubber sponge and provided with circumferential recesses 12 to enable them to come into engagement with the empties to entrain them. The drive for the entraining disks 11 may be in the form of a separate drive or may be derived from the drive of the conveying belt 6*b* placed under them by means of a bevel drive connection. The shafts of the draw-off disks 11 are accordingly placed so as to be perpendicular to the front bend axis of the conveying belt 6*b*. The bottles 3 drawn off by the draw-off disks 11 pass, as will be seen from FIG. 1, along a bottle table 19 which is placed at the end of the conveying passage 5 at generally the same level as the conveying belts 6*a* and 6*b*** so as to form a pile-up space.

The drive for the conveying belts **6*a* and 6*b* arranged side by side is at their oppositely placed longitudinal sides as will best be seen from FIG. 3. The bend roller, connected by means of a chain drive with the drive motor 9, of the rear conveying belt 6*a* is therefore provided with a stub shaft extending through the adjacent conveying belt 6*b* and bearing a sprocket wheel 10*c*, which by way of a chain 8 not shown in detail cooperates with the drive wheel 10*b* of the front conveying belt 6*b***.

The conveying devices provided for conveying the bottle crates 2 are in the form of a roller conveyor with two sections **14*a* and 14*b* arranged one behind the other, the rollers 15 thereof rotating about horizontal axes. Each section 14*a* and 14*b* is provided with a drive device 16, which cooperates via the chain drives 17 shown in FIG. 2 with the rollers of the respectively associated section 14*a* and 14*b*, respectively. As was the case with bottles 3 the separation of the consecutive crates 2 takes place by increase in speed. The crates 2 leaving the roller conveyor are, as will further be seen from figure 1, pushed out onto a table 20 which is placed at the end of the conveying passage 4 so as to be at the same level as the roller conveyor, said table 20 forming a pile-up space. The last roller 15 of the roller conveyor may be in the form of a jockey guide roller without any drive in order to bring about smooth transfer. In order to provide a lateral wall of the conveying passage over the rollers 15 there are lateral sheet metal parts 18**.

The conveying passages 4 and 5, respectively, are received on a common support frame 21, which has two stages placed one over the other and each accommodating one of the conveying passages 4 and 5, respectively. The support frame 21 may in this case consist of a portal frames 22 arranged one after the other which are connected together by longitudinal beams 23. On the uprightly placed columns of the frames 22 longitudinal guides 24 are secured in order to form the two superposed stages, such guides 24 extending along the entire length of the frame. In the illustrated working example of the invention it is in this respect a question of L-rails placed on the facing inner sides of the frames 22. On these longitudinal guides 24 there are sliding parts 25, **26*a* and 26*b* able to be pushed in like drawers and which each have a self-supporting box-like frame 27, on which there are the elements for forming the associated conveying passage 4 and 5**, respectively.

The drawer-like part 25 containing the bottle conveying passage 5 and arranged adjacent to the upper stage of the frame, extends in one piece from the front end gap 8 as far as the bottle receiving table 19, that is to say along the entire length of the bottle conveying passage 5. The front end inlet gap 8 is located adjacent to a door 28, which is pivotally arranged on the front portal frame 22, as will be seen from FIGS. 1 and 3. In FIG. 2 the reader will only see the pivotal bearing and the abutting mechanism of the door in the form of hinge cones 29 and eyes 30.

In the lower part of the crate conveying passage there are two drawer-like parts 26*a* and 26*b*, respectively, placed one behind the other and each containing one section 14*a* and 14*b* of the roller conveyor. The lower crate conveying passage 4 extends past the upper bottle conveying passage 5. Adjacent to the lower stage there is accordingly a frame head 21*b*, overlapped by the bottle receiving table 19 and which also has the longitudinal guides 24, provided for forming the lower stage, passing through it and which is adjoined by the crate receiving table 20. In order to ensure simple operation the section 14*a* which is to the rear in the direction of conveying, has its front end projecting by about the length of one crate past the front end portal frame 22 of the support frame 21 so that there is practically a sort of projecting load ramp, as is indicated in FIG. 1 at 31. The bottles 2 and the crates 3 are sensed by sensing means as they pass through the respective conveying passage 4 or 5 in order to be identified. The data so obtained is fed to an identifying computer, which then computes the deposit amounts and causes such deposit sums, if required, to be printed in the form of a voucher.

The sensing means provided for sensing the bottles 3 are, as will be seen from FIGS. 1 and 4, mounted on holders 32*a* and 32*b*, respectively, which may be located to the side of the front conveying belt 6*b* moving at a higher speed and secured to the frame 27 of the respective drawer-like part 25. These sensing means may take the form reflecting photoelectric detectors 33 arranged over each other so as to be parallel to the direction of conveying and across the direction of motion of the respective belt. The photoelectric detectors comprise sensors and reflectors placed opposite to each other. These reflecting photoelectric detectors 33 are used in conjunction with a belt speed signal, produced for example by means of an incremental disk 41 driven by the belt 6*b* and also shown in FIG. 4, to produce digitalized data with respect to the bottles 3 as they move past to cut the line between a respective sensor and reflector. The data produced with the aid of the superposed photoelectric detectors 33 relate to the diameter of the horizontal sections at the respective levels. Extensive testing has shown that using five sensing means arranged at distances of 15 mm, 125 mm, 150 mm, 204 mm and 270 above the conveying plane it is possible to identify practically all bottles in regular use.

The sensing means provided for sensing the crates 2 and arranged adjacent to the lower crate conveying passage 4 comprise a sensing head 34 extending with clearance over the rear, faster roller conveyor section 14*b* (see FIG. 3) and a number of lined-up reflection photoelectric detectors 35 arranged side by side, each sensing one track for sensing the degree of filling a crate. The measurement of height is performed by reflection photoelectric detectors 36 offset in relation to each other in height and placed adjacent to the longitudinal edges of the associated conveying passage 4. The measurement of breadth is performed together with lateral alignment of the crates in relation to the sensing head 34, which in the present case is arranged centrally. For this purpose the lateral sheet metal parts 18 are subdivided at the front section 14*b* of the roller conveyor 1. The respectively rear section is in this case in the form of a slide 37 moving across the direction of conveying. These slides 37 are mounted on holders 38 fitting between two respective rollers 15 and able to be moved by means of drive device 39, able to be frictionally coupled therewith so that motion takes place transversely and in the opposite direction to that of conveyance. The result of this is that the crates are centrally aligned as they move past. The reverse setting of the mutually opposite slides 37 for determining the breadth of a respective crate is sensed by proximity initiators 40 placed adjacent to the drive means 39.

In addition to the bottle and crate detecting means it is possible to have further reflection photoelectric detectors, indicated in FIG. 3 at 37, for activating and putting out of operation the individual drive members. In order to cover the full cross section of the conveying passage it is possible for such photoelectric detectors to be placed obliquely in space, that is to say inclined in relation to the conveying plane and the conveying direction. Such photoelectric detectors 47 are accordingly located at the front end inlet and the opposite outlet of the two conveying passages 4 and 5, respectively, and adjacent to the intermittent drive units as for example those in the form of ejection disks 11, lateral aligning slides 37 etc.

For digitally detecting distances moved by the spaced out crates 2 and the bottles 3 as they move past the respective sensing means 34, 35, 36 and 33, it is possible to employ incremental disks, as noted, of the same type as indicated at 41 in FIGS. 4 and 5. Such disks are coupled with the respective conveying parts. The incremental disk 41 shown in FIGS. 4 and 5 associated with the bottle sensing means 33 is in this case mounted by means of a hub on the shaft 42 of the drive motor 9 for the conveying belts 6*a* and 6*b*. Accordingly the speed of the incremental disk 41 bears a fixed relationship to the speed of the conveying belt 6*b* moving the bottles past the sensing means 33. The conveying belt 6*b* is, as will further be seen from FIG. 4, in the form of a hinge plate conveyor, whose hinge plates 43 are in positive engagement with the associated bend rollers so that there is no change of inaccuracies due to slip. The adjacent conveying belt 6*a* may also take the form of a hinge plate conveyor. Conveyors of this type lead to a high degree of stability along the plane of conveying. The two conveying belts 6*a* and 6*b* may be accommodated in a common tunnel indicated in FIG. 4 at 44. The incremental disk 41 is so arranged that its perforated periphery extends into a sensor 45 as a photoelectric detector, whose output signals are combined with the output signals of the reflection photoelectric detectors 33. The sensor 45 is secured to the frame 27 by means of a holder 46. If hinge plate conveyors should prove to be overly loud or insufficiently cost-effective, the conveying belt 6*a* and/or 6*b* may take the form of a longitudinal conveying belt which is preferably placed on a sheet metal support.

Adjacent to the crate conveying passage 4 it is also possible to provide an incremental disk, which is connected with a freely rotatable entraining roller 15*a* of the roller conveyor. In the illustrated working example of the invention the roller of the roller conveyor placed under the sensing head 34 is in the form of a non-driven entraining roller 15*a* and it may be arranged so that its elastic covering (made for instance of elastic material such as rubber sponge) projects somewhat. Accordingly the surface speed of the entraining roller 15*a* is exactly the same as the actual speed of bottom of the crate 2 with which it is in contact.

I claim:

1. A device for receiving empties comprising a conveying means and a sensing means associated therewith, such conveying means comprising a conveying passage which comprises two parallel sections which are offset in relation to each other in the direction of conveying and have conveying belts placed side by side and arranged to be driven at different speeds, and an intermediate member extending obliquely in relation to the direction of motion of the conveying belts so as to bridge over a gap between the adjacent conveying belts, an outlet end part of the section with the more rapid conveying belt under it extending past the sensing means, which has a number of vertically offset sensing elements, aligned so as to be generally parallel to the plane of conveyance and adapted to sense the diameter of the empties.

2. The device as claimed in claim 1 wherein said sensing elements are adapted to operate without making physical contact with the empties and to produce a signal corresponding to the time taken by such empty moved past them and intercepting the line of photoelectric detection, such signal being modified in accordance with the speed of the respective conveying belt.

3. The device as claimed in claim 1 wherein said sensing means are in the form of reflection photoelectric detectors.

4. The device as claimed in claim 1 comprising a measuring device for the speed of the more rapidly moving conveying belt moving past the sensing element with which said measuring device is coupled.

5. The device as claimed in claim 4 wherein said measuring device includes an incremental disk and an associated sensor for responding to rotational steps of the disk.

6. The device as claimed in claim 1 wherein said conveying belts are in the form of hinge plate conveying belts whose hinge plates are arranged in positive engagement with associated bend rollers of the belts.

7. The device as claimed in claim 1 wherein a section of the conveying passage having the sensing elements is narrower than a section of the passage placed further to the rear.

8. The device as claimed in claim 1 wherein said conveying belts are arranged to be driven from mutually opposite sides thereof, a driven roll being provided with a stub shaft extending through the adjacent conveying belt.

9. The device as claimed in claim 1 comprising two draw-of disks adapted to rotate about axes perpendicular to the plane of conveying, the front end of the conveying passage extending into a gap between such disks.

10. The device as claimed in claim 9 wherein such draw-off disks are provided with an elastic covering having entraining recesses.

11. The device as claimed in claim 9 wherein the draw-off disks are arranged so as to be perpendicular to a front bend roller of front conveying belt.

12. The device as claimed in claim 1 comprising a table placed downstream from the conveying passage.

13. The device as claimed in claim 1 comprising a self-supporting frame and longitudinal guides of a machine frame, said conveying passage being mounted on said frame, which runs like a drawer on the longitudinal guides.

14. The device as claimed in claim 1 comprising a machine frame and a covering door arranged at a front end thereof, such door having an opening adjacent to the conveying passage.

15. The device as claimed in claim 1 comprising photoelectric detectors arranged at the inlet and outlet of the conveying passage at least.

16. The device as claimed in claim 1 comprising five sensing elements arranged at distances of 15 mm, 125 mm, 150 mm, 104 mm and 270 above the conveying plane on which said empties are supported.

17. The device as claimed in claim 10 wherein said draw-off disks are provided with a rubber sponge covering and the device further comprises a table arranged after and tat the same level as the conveying passage and furthermore photoelectric detectors at inlet and outlet ends of the conveying passage, such detectors being arranged obliquely to the conveying plane and the conveying direction.

* * * * *